UNITED STATES PATENT OFFICE.

CHARLES FROUDE CURTIS, OF PONTARDAWE, WALES.

COMPOSITION FOR THE MANUFACTURE OF LININGS OF ACID-POTS OR SUCH LIKE VESSELS.

1,311,051.     Specification of Letters Patent.     Patented July 22, 1919.

No Drawing.     Application filed April 19, 1919. Serial No. 291,359.

*To all whom it may concern:*

Be it known that I, CHARLES FROUDE CURTIS, a subject of the King of Great Britain, residing at 4 Gwyn street, Alltwen Hill, Pontardawe, in the county of Glamorgan, South Wales, have invented a certain new or Improved Composition for the Manufacture of Lining of Acid-Pots or Such Like Vessels and Analogous Purposes, of which the following is a specification.

This invention consists of a new or improved composition for the manufacture of base linings of acid pots or such like vessels and analogous purposes.

For the inner lining in contact with acids an acid resisting material would be used. My new composition will withstand a high temperature, much higher even than the melting point of lead, which is the material still commonly used.

An essential of my present composition is a powder, which occurs as a waste residue in furnaces after pyrites has been burned or otherwise treated, to extract the sulfur or other chemicals or minerals. It is a burnt dust of no further use to the manufacturer, and, as is well known, is an acid resisting material.

It has the appearance of a red oxid, and is too fine for use as ballast. Large quantities of it are available in South Wales and elsewhere. Though usually rejected as a furnace waste, it has been discovered by me to be of use when mixed with other ingredients, to form my present composition.

The present composition comprises the above residue, together with sawdust, Portland cement and whiting. The proportions are approximately as follows:

| | |
|---|---|
| Sawdust | 30% |
| Portland cement | 30% |
| Whiting | 10% |
| The waste residue $Fe_2O_3$ | 30% |
| | 100% |

This composition is mixed together and moistened. It may be laid upon a foundation with a trowel and left to harden, but, most probably, its chief use will be the manufacture of homogeneous pots or other vessels, which may be molded either with or without pressure, hydraulic or otherwise, any suitable kind of molds being employed for the purpose.

The composition is also useful for the manufacture of electric fuse boxes, especially for coal mines, inasmuch as such a box could not burn up, as iron boxes sometimes do by an electric arc set up after the burning of the fuse.

One of the qualities of my present composition is that it is electrically nonconductive.

I claim—

A composition for the manufacture of lining of acid pots or such like vessels and analogous purposes, of which the ingredients and proportions are approximately as follows: sawdust 30%, Portland cement 30%, whiting 10% and the residue dust from burnt pyrites 30%, the resultant mixture being moistened for use in any of the ways herein specified or for analogous purposes.

In testimony whereof, I have signed my name to this specification in the presence of two subscribing witnesses.

CHARLES FROUDE CURTIS.

Witnesses:
    ARTHUR H. STANLEY,
    SAMUEL G. ALFORD.

Copies of this patent may be obtained for five cents each, by addressing the "Commissioner of Patents, Washington, D. C."